Jan. 2, 1945.  D. H. MITCHELL  2,366,279
CONVEYER SYSTEM
Filed June 16, 1942
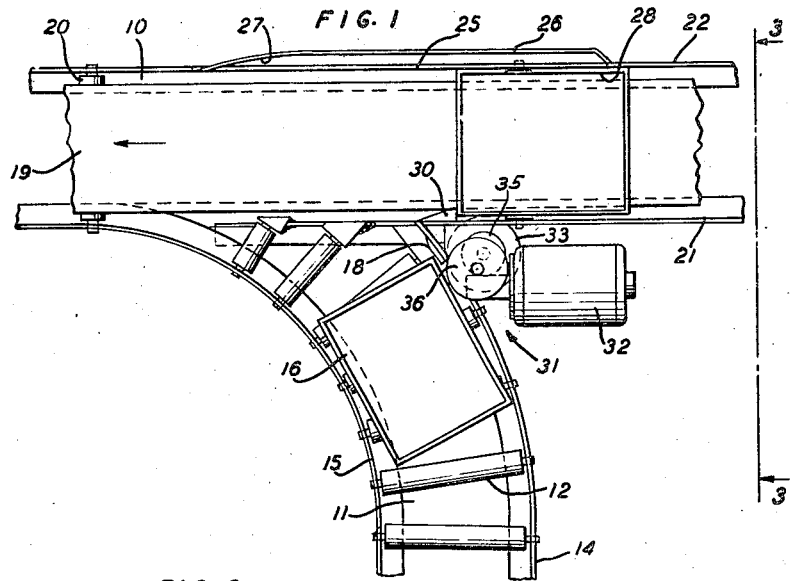
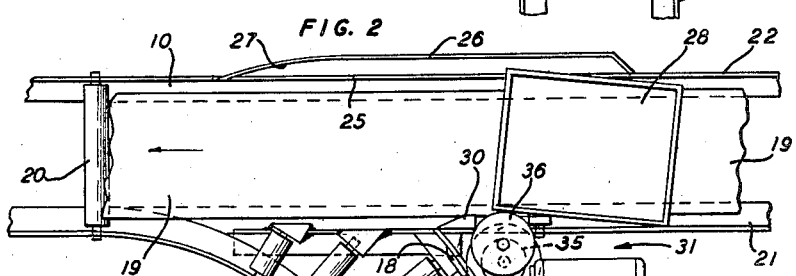
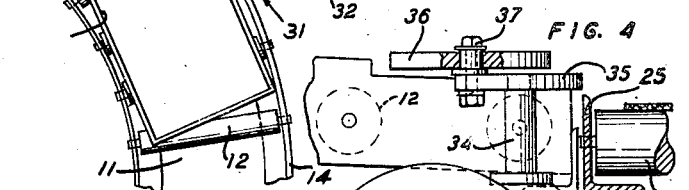
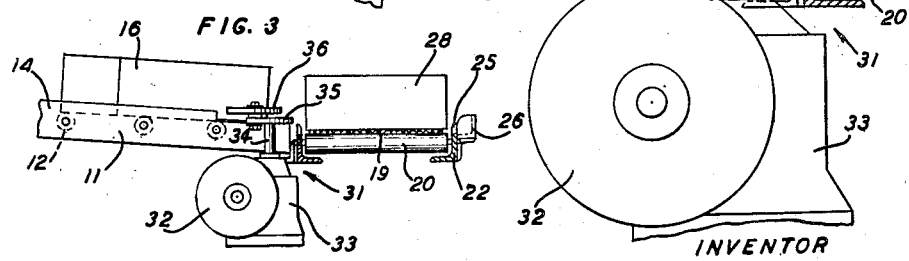
INVENTOR
D.H. MITCHELL
BY
E.R. Nowlan
ATTORNEY Patented Jan. 2, 1945

2,366,279

UNITED STATES PATENT OFFICE 2,366,279

CONVEYER SYSTEM

Donald H. Mitchell, Cranford, N. J., assignor to Western Electric Company, Incorporated, New York, N. Y., a corporation of New York Application June 16, 1942, Serial No. 447,201

10 Claims. (Cl. 198—78)

This invention relates to conveyer systems, and more particularly to traffic controlling means therefor.

It is important in conveyer systems to control the traffic of carriers or articles thereon, particularly at the juncture of two or more conveyers where the paths of the carriers converge. It is also ofttimes important to control the spacing of the carriers on the conveyers to allow for the removal of any of the carriers from the conveyers and to eliminate jamming of one carrier with another.

An object of the invention is to provide a conveyor system, and more particularly a simple, efficient and highly practical traffic control means therefor.

With this and other objects in view, the invention comprises a conveyer system including conveyers for transporting articles in converging paths, fixed members to stop the articles adjacent the juncture of the conveyers, and a unit actuable to release the carriers from their stops in predetermined order and at given time intervals to cause travel of the carriers at predetermined spaced positions.

Other objects and advantages will be apparent from the following detailed description when considered in conjunction with the accompanying drawing, wherein Fig. 1 is a fragmentary top plan view of a portion of a conveyor system illustrating the invention with the control unit in one position;

Fig. 2 is a fragmentary top plan view of the structure shown in Fig. 1 with the control unit in another position;

Fig. 3 is a fragmentary sectional view taken substantially along the line 3—3 of Fig. 1, and Fig. 4 is an enlarged fragmentary sectional view illustrating the features of the control unit.

Referring now to the drawing, attention is first directed to Figs. 1 and 2 which are identical with the exception of the positions of the control unit and carriers affected thereby. In these figures a fragmentary portion of a conveyer system is illustrated and includes conveyers 10 and 11. In the present embodiment the conveyer 10 is of the endless belt type, while conveyer 11 is of the gravity feed type provided with a series of spaced rollers 12 supported by guide rails 14 and 15. In Fig. 3, it will be observed that the conveyer 11 extends downwardly toward the conveyer 10 at an angle sufficiently great to cause carriers 16 to roll freely by gravity on the rollers 12. It will be observed, by viewing Figs. 1 and 2, that the conveyer 11 is also curved to direct carriers 16 onto the conveyer 10. This formation of the conveyer 11 will cause the carriers 16, only one of which is shown, to hug the guide rail 14 in its downward travel and thus engage a fixed stop 18 short of the juncture of the two conveyers.

In the structure of the conveyer 10, an endless belt 19 passes over spaced rollers 20 rotatably supported by the frame including guide rails 21 and 22. As illustrated in Figs. 1 and 2, the guide rails in each conveyer extend vertically sufficient distances to control a travel of the carriers thereon. However, in the conveyer 10 the guide rail 22 is reduced in height for a considerable length, as indicated at 25, between the ends of an auxiliary guide rail 26 which extends beyond the guide rail 22 for a purpose hereinafter described. The guide rail 26 also curves into the guide rail 22 at its forward end, as indicated at 27. For the purpose of illustration, the carrier shown on the conveyer 10 is given a reference numeral 28, although these carriers may be identical in structure. This carrier, in travelling on the conveyer 10 in a path guided by the rails 21 and 22, will move into engagement with a fixed stop 30 mounted on the rail 21 adjacent the juncture of the two conveyers. A control unit, indicated generally at 31, includes a power means, such as an electric motor 32, which drives a speed reducing mechanism 33, and an output shaft 34 which supports a concentric element 35. The element 35 is in the form of a wheel centrally mounted upon a shaft 34 and supporting a control element or roller 36 rotatably supported at 37, a position eccentric with the shaft 34.

During the operation of the conveyer system, let it be assumed that a plurality of carriers 16 is disposed upon the conveyer 11 and moving toward the conveyer 10, and that a plurality of carriers 28 is advancing in the direction of the arrow on the conveyer 10. The carriers on these conveyers will all be stopped by their respective fixed stop members 18 and 30 as they approach the juncture of the conveyers. During the actuation of the unit 31, the element or roller 36 is moved in a circuitous path which causes the periphery of the roller to pass over the sides or guide rails of the conveyors at alternate spaced time intervals, to alternately move the carriers thereon away from their stop members. For example, by viewing Fig. 1 it will be observed that the carrier 16, illustrated, has just been moved free of its stop member 18 and is free to travel onto the conveyer 10. The element 36 in its substantially frictionless mounting, does not interfere with the free travel of the carrier although it may engage the carrier during the beginning of the carrier's movement toward the conveyer 10.

The timing of the circuitous movement of the element is such that the carrier 16 will have moved onto the conveyer 10 before the carrier 28 on that conveyer is released. When that time arrives the element 36 will engage the carrier 28 and move it laterally free of the stop member 30 and allow the carrier to be moved by the endless belt relative to the element 36. The special structure of the inward portion of the guide rail 22 and the provision of the auxiliary rail 26 allow the lateral movement of the carrier 28 by the element 36 and the longitudinal movement of the carrier with the conveyer until the carrier has moved beyond the stop 30. At this time the curved portion 27 and the auxiliary guide rail 26 will move the carrier 28 back into position on the endless belt to continue its travel at a given position spaced from the carrier 16, which has previously been allowed to travel onto the conveyer 10.

Thus it will be apparent that by stopping all carriers on their conveyers through the aid of the stop members 18 and 30 and the movement of the element 36 at a given speed, the carriers on the conveyers will be alternately freed for advancement in a given path at definite spaced positions with respect to each other. Furthermore, the traffic of the carriers on the two conveyers is under positive control, resulting in the equal feeding of the carriers from both conveyers and the equal spacing of these carriers on the final conveyer. It should be understood that although a main conveyer and a branch conveyer are illustrated, this control means could be employed to control the traffic of the carriers from two conveyers onto a third conveyer, or on two conveyers crossing each other or other possible arrangements, due to the fact that all carriers are positively stopped and released individually in a given order. In other words, the control means may control carriers travelling in paths converging tangentially, or transversely at varying angles.

Although specific improvements of the invention have been shown and described it will be understood that they are but illustrative and that various modifications may be made therein without departing from the scope and spirit of this invention as defined by the appended claims.

What is claimed is:

1. In a conveyer system, conveyers to transport carriers in converging paths, separate stops for each conveyer to stop the carriers thereon prior to a converging point of the paths, a rotatable element, and means to move the element alternately relative to the stops to cause freeing of the carriers of their stops in a given order.

2. In a conveyer system, conveyers to transport carriers in converging paths, separate stops for each conveyer to stop the carriers thereon prior to a converging point of the paths, an element, and means to move the element at a given speed to cause the element to engage a carrier on one of the conveyers and move it free of its stop for continued transportation thereof and at a given time thereafter to cause the element to engage a carrier on another conveyer and move it free of its stop.

3. In a conveyer system, conveyers to transport carriers in converging paths, separate stops for each conveyer to stop the carriers thereon prior to a converging point of the paths, and a single means actuated to alternately engage the carriers on the different conveyers and move them free of their stops.

4. In a conveyer system, conveyers to transport carriers in converging paths, separate stops for each conveyer to stop the carriers thereon prior to a converging point of the paths, and a single means actuated to alternately engage the carriers on the different conveyers and move them free of their stop at given time intervals.

5. In a conveyer system, means to transport carriers in definite paths, a plurality of which paths empty into a single one of the paths at their junctures thereof, separate stops for the carriers in the said plurality of paths disposed in advance of the said junctures, an element, and means to move the element to cause it to engage the carriers and move them free in the plurality of paths of their stops in a given order.

6. In a conveyer system, means to transport carriers in definite paths, a plurality of which paths empty into a single one of the paths at their junctures thereof, separate stops for the carriers in the said plurality of paths disposed in advance of the said junctures, and a single means actuated to singly engage the carriers and move them free of their respective stops in a definite order to cause the carriers to pass onto the single path from the other paths at spaced positions.

7. In a conveyer system, means to transport carriers in definite paths, a plurality of which paths empty into a single one of the paths at their junctures thereof, separate stops for the carriers in the said plurality of paths disposed in advance of the said junctures, and a single means actuated to singly engage the carriers and move them free of their respective stops in a definite order to cause the carriers to pass successively onto the single path from the other paths at spaced positions.

8. In a conveyer system, conveyers to transport carriers in converging paths, separate stops for each conveyer to stop the carriers thereon prior to a converging point of the paths, an element, and means to move the element in a circular path to cause the element to engage the stopped carriers at different time intervals to free the carriers successively from their stops.

9. In a conveyer system, conveyers to transport carriers in converging paths, separate stops for each conveyer to stop the carriers thereon prior to a converging point of the paths, a rotatable element, and means to rotatably support the element and move it in a circular path into engagement with the stopped carriers at different time intervals to free the carriers successively from their stops.

10. In a conveyer system, conveyers to transport carriers in converging paths, separate stops for each conveyer to stop the carriers thereon prior to a converging point of the paths, a roller, and means to move the roller in a circuitous path to cause the roller to intermittently move the carriers successively from their stops.

DONALD H. MITCHELL.